United States Patent
Davis (10) Patent No.: US 7,413,063 B1
(45) Date of Patent: Aug. 19, 2008

(54) COMPRESSIBLE FLUID MAGNETORHEOLOGICAL SUSPENSION STRUT

(75) Inventor: Leo W. Davis, Addison, TX (US)

(73) Assignee: Davis Family Irrevocable Trust, Harlingen, TX (US)

( * ) Notice: Subject to any disclaimer, the term of this patent is extended or adjusted under 35 U.S.C. 154(b) by 375 days.

(21) Appl. No.: 10/786,817

(22) Filed: Feb. 24, 2004

Related U.S. Application Data (60) Provisional application No. 60/449,761, filed on Feb. 24, 2003.

(51) Int. Cl.
*F16F 9/53* (2006.01)

(52) U.S. Cl. .................. 188/267.1; 188/318; 188/322.5

(58) Field of Classification Search ...... 188/266–267.2, 188/315, 322.19, 318, 322.5, 322.15
See application file for complete search history.

(56) References Cited

U.S. PATENT DOCUMENTS

| | | | |
|---|---|---|---|
| 3,047,507 A | 7/1962 | Winslow | |
| 3,207,269 A | 9/1965 | Klass | |
| 3,321,210 A * | 5/1967 | Nedelko | 280/5.507 |
| 4,624,476 A | 11/1986 | Tanaka et al. | |
| 4,668,417 A | 5/1987 | Goossens et al. | |
| 4,819,772 A * | 4/1989 | Rubel | 188/267.1 |
| 4,992,190 A | 2/1991 | Shtarkman | |
| 5,018,606 A | 5/1991 | Carlson | |
| 5,152,547 A | 10/1992 | Davis | |
| 5,167,850 A | 12/1992 | Shtarkman | |
| 5,227,038 A | 7/1993 | Smalley et al. | |
| 5,277,281 A | 1/1994 | Carlson et al. | |
| 5,300,203 A | 4/1994 | Smalley | |
| 5,354,488 A | 10/1994 | Shtarkman et al. | |
| 5,396,973 A * | 3/1995 | Schwemmer et al. | 188/267.1 |
| 5,525,249 A | 6/1996 | Kordonsky et al. | |
| 5,655,757 A | 8/1997 | Starkovich et al. | |
| 5,667,715 A | 9/1997 | Foister | |
| 5,711,746 A | 1/1998 | Carlson | |
| 5,985,168 A | 11/1999 | Phule | |
| 6,068,249 A | 5/2000 | Shtarkman | |
| RE37,015 E * | 1/2001 | Rensel et al. | 188/267.1 |
| 6,318,521 B1 * | 11/2001 | Niaura et al. | 188/267.1 |
| 6,352,143 B1 * | 3/2002 | Niaura et al. | 188/267.1 |
| 6,389,341 B1 | 5/2002 | Davis | |
| 6,390,252 B1 * | 5/2002 | Namuduri et al. | 188/267.2 |
| 6,471,018 B1 * | 10/2002 | Gordaninejad et al. | 188/267.1 |
| 6,640,940 B2 | 11/2003 | Carlson | |

(Continued)

*Primary Examiner*—Chris Schwartz
(74) *Attorney, Agent, or Firm*—Mark W Handley (57) ABSTRACT

A strut (12) is configured for an active suspension system (142) which provides electronic control for both the force applied by the strut (12) and the dampening characteristics of the strut (12). A compressible fluid (18) is used within the strut (12), and preferably includes a compressible base fluid and electromagnetic field responsive particles (132) which are suspended in the compressible base fluid. The electromagnetic field responsive particles (132) are preferably closely matched in density and modulas of elasticity to that of the compressible base fluid to prevent sedimentation of the particles (132) and to maintain the elasticity of the compressible fluid (18). The amount compressible fluid (18) within the strut (12) is electronically controlled to determine the force applied by the strut (12) and a field strength applied to the compressible fluid in a fluid flow passage is electronically controlled to determine the dampening characteristics of the strut (12).

9 Claims, 7 Drawing Sheets

U.S. PATENT DOCUMENTS

| | | |
|---|---|---|
| 6,681,905 B2 | 1/2004 | Edmondson et al. |
| 6,683,783 B1 * | 1/2004 | Smalley et al. .............. 361/502 |
| 6,695,102 B1 * | 2/2004 | Marjoram et al. ........ 188/267.2 |
| 6,749,048 B2 | 6/2004 | Coombs |
| 6,953,108 B2 | 10/2005 | Anderfaas et al. |
| 2004/0195062 A1 | 10/2004 | Anderfaas et al. |
| 2005/0230195 A1 * | 10/2005 | Jones et al. ................... 188/68 |

* cited by examiner

COMPRESSIBLE FLUID MAGNETORHEOLOGICAL SUSPENSION STRUT

CROSS-REFERENCE TO RELATED APPLICATION

The present application is a Continuation in Part of U.S. Provisional Patent Application Ser. No. 60/449,761, filed Feb. 24, 2003, and invented by Leo W. Davis.

TECHNICAL FIELD OF THE INVENTION

The present invention relates in general to suspensions for vehicles, and in particular to suspension struts which are electronically controlled.

BACKGROUND OF THE INVENTION

Prior art suspension systems have been provided for motor vehicles to isolate the vehicle frame, or chassis, from impacts and vibrations resulting from vehicle wheels traversing uneven terrain. Vehicle ride characteristics have complex dynamics characterized by nonlinearities, vehicle roll and pitch, vehicle flexibility effects, varying parameters, unknown friction, deadzones and high amplitude disturbances. Excess vibration results in artificial vehicle speed limitations, reduced vehicle-frame life, biological effects on passengers and detrimental consequences to cargo. Present automobile suspension systems traditionally use passive suspension systems which can only offer a compromise between the two conflicting criteria of comfort and performance by providing spring and dampening coefficients of fixed rates. For example, sports cars usually have stiff, harsh, performance suspensions with poor ride quality, while luxury sedans typically have softer suspensions with poor road handling capabilities. Passive suspension systems have been provided by separate coil springs and shock absorbing dampers, in which power is input by a controlled power source to counteract impacts and vibrations resulting from traversing the rough terrain. The traditional engineering practice of designing spring and dampening functions as two separate functions has been a compromise from its inception in the late 1800s. As a result, vehicles have always been designed, styled and built around the space-weight requirements and performance limitations of traditional suspension configurations. Due to the demands of increased fuel mileage and decreased emissions, passenger and commercial vehicles are becoming lighter, which results in the differences between laden and unladen weights of the vehicles becoming so broad that traditional suspension systems are unable to span the load range effectively, causing serious degradation in performance of the vehicle ride quality, load handling and control.

Active suspension systems attempt to reduce these undesirable ride characteristics by providing active, powered components which isolate the car body from tire vibrations induced by uneven terrain, to provide improved comfort, road handling performance and safety for a variety of terrains and vehicle maneuvers. In active vehicle suspension systems, actuators are provided to actively apply forces which counteract and balance forces applied to the chassis of the motor vehicle. Such active systems have used various control schemes to determine the amount of force which actuators should apply to the vehicle chassis to provide a smoother ride, such as schemes based on balancing the forces acting on the chassis and schemes based on supporting the vehicle chassis at a selected ride height. Active suspension systems should be able to provide different behavioral characteristics dependent upon various road conditions, without going beyond the travel limits of active suspension components. However, active systems typically require large power inputs to provide an actuator that is quick enough to compensate for impacts and vibrations which occur at desired traveling velocities over rough terrain. The power requirements for such fully active suspension systems are generally prohibitive.

Some prior art passive suspension systems have utilized struts which contain a compressible fluid which is preferably a liquid, rather than a mixture of a liquid and a gaseous fluid. A rod extends into a cylinder and provides a fluid displacement member, such that the fluid pressure within the cylinder is increased by displacement of the compressible fluid when the rod is inserted further into the cylinder. A piston-like member is mounted to the inward end of the rod and provides a dampening device. Such struts have effectively combined into a single unit the spring and damper functions of prior art suspension system components. Control means have also been suggested for such strut systems, in which the fluid pressure within the struts are controlled to determine spring rate coefficients for the struts, such as the control system for vehicle suspension shown in U.S. Pat. No. 6,389,341, invented by Leo W. Davis, and issued May 14, 2002, which is hereby incorporated by reference as if fully set forth herein.

Although active control systems have been utilized to apply force to struts, that is, to add energy to the struts of suspension systems to prevent vehicle roll, they have not been combined with active dampening. In the prior art, dampening with active control systems has been accomplished by mechanical dampening systems in which the level of dampening is applied is a function of the velocity at which a dampening component is traveling relative to a cylinder of the strut. The level of dampening is not electronically controlled, but rather is accomplished via pressure applied to dampening members as a result of the velocity at which the dampening member is traveling through a fluid in the strut. For example, a dampening piston is disclosed in U.S. Pat. No. 6,389,341 having two sets of flow ports through the dampening piston, a first set of flow ports which are always open and a second set of flow ports through which fluid flow is controlled by a spring biased valve member. The valve member is moved by fluid pressure which is caused by the velocity of the dampening piston in traveling through a fluid, with increased fluid pressure due to higher velocities causing the valve member to move against a bias spring from a closed position to an open position to open the second set of flow ports through the dampening piston. This provides two set levels of dampening according to whether the valve member has been moved to the open position as a result of the velocity of the dampening piston traveling through the fluid.

Systems have been suggested for electronically controlling the level of dampening in suspension struts, primarily with use of electrorheological ("ER") fluids or magnetorheological ("MR") fluids. The viscosity of ER fluids is increased by application of an electric field to the fluid. Similarly, the viscosity of MR fluids are increased by application of a magnetic field to the MR fluid. The viscosity of ER fluids and MR fluids can be increased, such that field controlled valves to regulate and/or prevent fluid flow can be established by application of electric fields and magnetic fields, respectively, to flow passages. U.S. Pat. No. 5,985,168, invented by Pradeep P. Phule, and issued Nov. 16, 1999, discusses ER and Mr fluids, and discloses a magnetorheological fluid, and is hereby incorporated by reference, as if fully set forth herein.

Prior art suspension systems which use ER and MR fluids have encountered several problems which have prevented their use in struts. Namely, prior art ER and MR fluids have relied on the response of ferrous particles to applied electric fields and magnetic fields, respectively, to polarize the ferrous particles to increase the viscosity of ER and MR fluids. The ER and MR fluids have been provided by colloidal suspension of the ferrous particles in a base fluid. However, over relatively short periods of time, as compared to the typical service life of strut components for vehicle suspension systems, the ferrous particles have settled out of suspension in the base fluids rendering the respective electric field and magnetic field controlled valving schemes for determining the dampening characteristics of struts inoperable. Ferrous particle sediments have also damaged strut seals where strut rods pass from within strut cylinders to exterior suspension components.

SUMMARY OF THE INVENTION

A strut for an active suspension system provides electronic control for both the force applied by the strut and the dampening characteristics of the strut. A compressible fluid is used within the strut, and preferably includes a compressible base fluid and electromagnetic field responsive particles which are suspended in the compressible base fluid. The electromagnetic field responsive particles are preferably closely matched in density and modulus of elasticity to that of the compressible base fluid to prevent sedimentation of the particles and to maintain the elasticity of the compressible fluid. The amount of compressible fluid within the strut is electronically controlled to determine the force applied by the strut, and a field strength applied to the compressible fluid in a fluid flow passage is electronically controlled to determine the dampening characteristics of the strut. The strut has an inner bore which defines a cylinder. A sleeve is disposed inside of the cylinder to define a primary fluid chamber, with an upper portion and a lower portion. A secondary fluid chamber is defined by the annular space between the exterior of the sleeve and the bore defining the cylinder. The compressible fluid is disposed within the primary and secondary chambers. Fluid displacement members are moveably extensible into each of the primary fluid chambers, and respective seals sealingly engage between heads of each of the cylinders and the fluid displacement members to retain the compressible fluid within the cylinders. The control valves are operated to apply fluid pressure from the accumulator to the cylinder chambers to determine the values for the spring rate coefficients and dampening coefficients of the struts. An electromagnetic field generator is preferably provided by an electric coil disposed exteriorly about the sleeve for providing an electromagnetic field in the secondary chamber to control the flow characteristics of the compressible fluid within the secondary chamber.

The strut is preferably used in a suspension system for supporting a suspended body relative to a support member which is subject to vibratory motion. The struts supportively engage between the suspended body and the support member, with first ends of the struts connected by the respective fluid displacement members to the support members, and the second ends of the struts connected by the respective cylinders to the suspended body. An accumulator is pressurized by a pump and is connected to the cylinder chambers of the various struts by control valves. Sensors are operatively connected to the struts for detecting positions of the suspended body relative to the support member. A data processing unit is operatively connected to the sensors and to the control valves of each of the struts. The data processing unit emits control signals to the control valves to determine the amount of the compressible fluid disposed within each of the struts in response to sensed values for the relative positions between the suspended body to the support member. The amount of the compressible fluid disposed within each of the cylinders of the struts is preferably controlled to determine values for the respective spring rate coefficients of the struts. A voltage applied to the coil is preferably controlled to determine the strength of an electromagnetic field applied to a magnetorheological fluid, which determines dampening coefficients for the struts.

The spring rate and dampening coefficients are selected to apply balancing forces which are equal to the sum of several force components. The first force component is a an ideal, target force component based on the amount of force required to balance the various other forces acting upon the vehicle chassis. This target force component is summed together with several feedback loop force components, which include a comparison of the desired target strut force to an actual force applied by the strut, a comparison of velocity of the chassis relative to a selected sky hook reference datum, and a ride height error which is determined by comparing the actual vehicle ride height to a desired ride height for the vehicle. Frequency dependent filtering is also applied to decrease the spring rate coefficients in response to detected changes in relative positions between the suspended body and the support member which occur at frequencies beneath a low frequency threshold level, and to increase or decrease the dampening coefficients in response to detected changes in relative motion between the suspended body and the support member which occur at frequencies above a high frequency threshold level. The threshold frequencies are preferably determined by selected offsets from corresponding wheel frequencies. The amounts by which the spring rate and dampening coefficients are increased or decreased are preferably in proportion to the differences between the detected frequencies and the respective threshold frequencies. The control system is optimized for ride control by reduction of chassis acceleration and for stability by roll, pitch, and yaw control.

The struts for use in such a suspension system preferably have pistons mounted to respective fluid displacement members to divide the cylinder chambers into two opposed chambers. The dampening pistons are moveable with the fluid displacement members within the cylinder chambers. Flow paths are provided to opposite sides of the pistons so that fluid flow occurs between the two opposed pressure chambers of respective ones of the cylinder chambers. The fluid mass in the two opposed chambers can be changed using a control valve or with pulse width modulated charge and discharge valves. The compressibility of the fluid determines a spring rate coefficient, and the flow paths to opposite sides of the pistons determine dampening coefficients for the struts. Thus, the struts have respective spring rate coefficients and dampening coefficients and the capacity to vary the spring rate coefficient and the dampening coefficient all in a single unit. For high-frequency motion, the passive dampening features of the strut can be relied on, such that energy is not expended trying to generate all the strut forces by active means. Such struts offer direct replacement for traditional spring/shock absorber units as well as in-line MacPherson strut spring/shock configurations. Suspension systems using such struts can provide higher performance response speeds, greater dampening power, and adjustable spring and dampening rate coefficients to maintain effective usage of the full strut travel while accommodating variations in both empty and loaded vehicle weights, and for dynamic loads.

DESCRIPTION OF THE DRAWINGS

For a more complete understanding of the present invention and the advantages thereof, reference is now made to the following description taken in conjunction with the accompanying Drawings in which FIGS. 1 through 11 show various aspects for a Compressible Fluid magnetorheological suspension strut made according to the present invention, as set forth below:

DETAILED DESCRIPTION OF THE INVENTION

Figure 1:
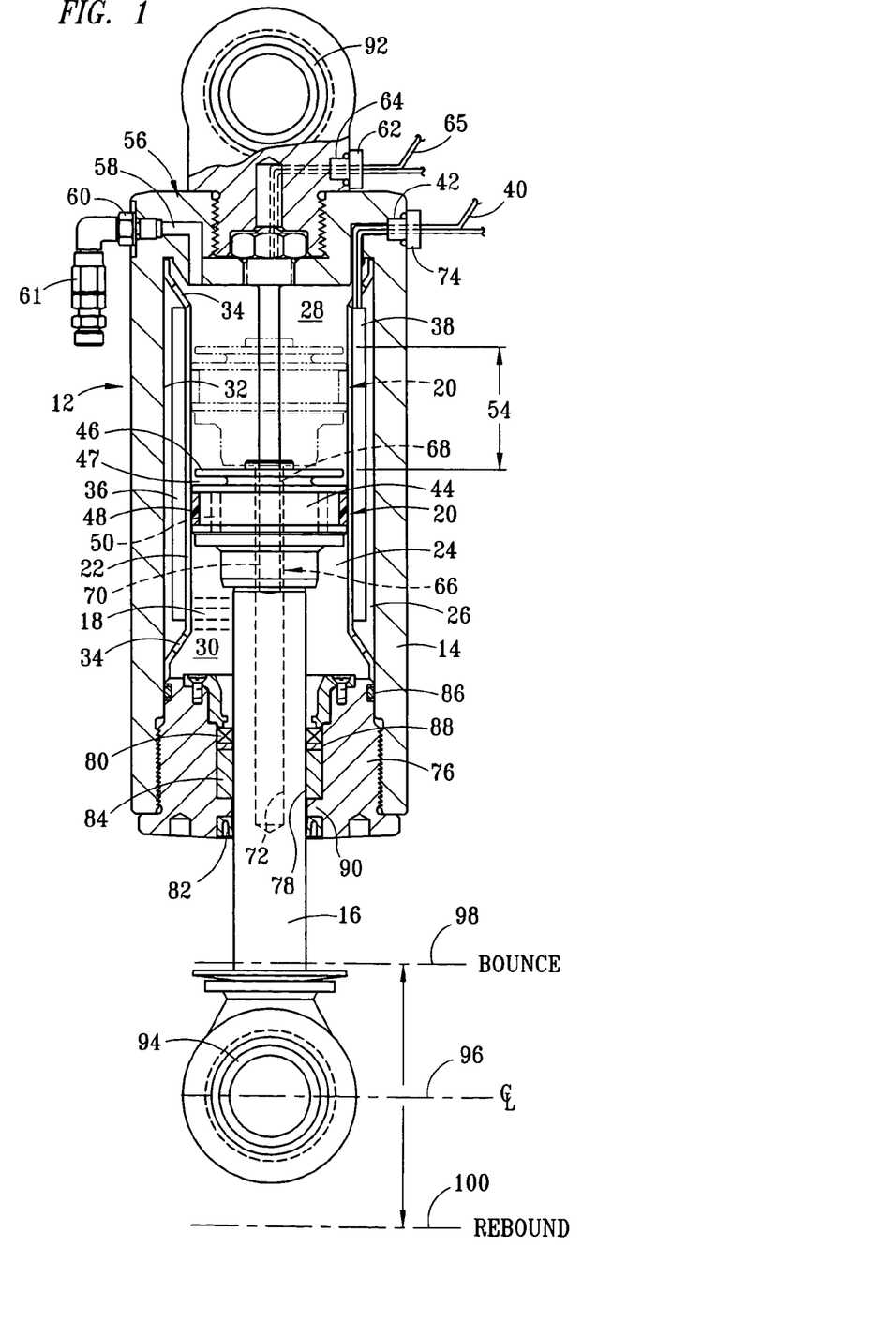
FIG. 1 is a longitudinal section view of a strut made according to the present invention.

FIG. 1 is a partial longitudinal section view of a strut 12 having a cylinder 14 and piston 16. Preferably, the piston member 16 is provided by a cylindrically-shaped rod, which provides a displacement member for displacing fluid within the cylinder 14. A compressible fluid magnetorheological ("MR") fluid 18 is disposed within the cylinder 14, and pressure of the compressible fluid 18 within the cylinder 14 applies force across a cross-sectional area of the piston 16. A damper element 20 is secured to an inward end of the piston 16. A sleeve 22 is rigidly mounted within the cylinder 14 to define a primary fluid chamber 24 and a secondary fluid chamber 26. The primary fluid chamber 24 is preferably disposed interiorly within the secondary fluid chamber 26. The primary fluid chamber 24 has a first region 28 and a second region 30 defined on opposite sides of the damper element 20, with the first region 28 preferably being inward of the second region 30, defined relation to an outer direction being the end of the strut 12 from which the piston 16 extends. The secondary fluid chamber 26 is preferably defined by an annular-shaped flow passage 32 which continuously extends around the sleeve 22, but in other embodiments may have various chambers which extend longitudinally with respect to the strut 12. A plurality of apertures 34 are disposed in the inward and outer ends of the sleeve 22 to provide flow ports for the compressible, magnetorheological fluid 18 for passing through the annular-shaped flow passage 32 and between the first region 28 and the second region 30 of the primary chamber 24 of the strut 12.

A field means 36 is preferably provided by coil windings 38 which provide an electromagnet extending around the exterior of the sleeve 22. Electric current is passed through the coil windings 38 to provide a magnetic field within the secondary fluid chamber 26 defining the flow passage 32. Electrical conductors 40 connect the coil windings 38 to a control section 150 (shown in FIG. 4) which applies an electrical signal to the coil windings 38 to control the strength of the magnetic field within the secondary fluid chamber, to thus affect the dampening characteristics of the strut 12. Preferably, either a twelve volt dc or twenty-four volt dc current ranging from zero to one-hundred amperes is applied to control the dampening stiffness of the strut 12.

The damper element 20 is disposed interiorly within the cylinder 14 and the sleeve 22, and is shown in two positions. The damper element 20 is shown in a first position by solid, object lines, and is shown in phantom in a second position after moving upwards a distance 54. The damper element 20 has a main body 44 which is mounted to the inward end of the piston 16, preferably being threadingly secured to the piston 16. A wear ring 46 extends around the exterior of the main body 44 to slidably engage the interior walls of the sleeve 22 as the piston 16 and the main body 44 of the damper element 20 are moved within the cylinder 14. The damper element 20 further includes a forward member 46 which is mounted forward of the main body 44, separated from the forward end of the main body 44 by a gap 48. Flow ports 50 extend through the main body 44 of the damper element 20 for providing pressure relief across the damper element 20.

A head 56 is provided on one end of the cylinder 14, preferably integrally formed with the cylinder 14. A flow port 58 is provided in the head 56 for connecting the interior of the cylinder defining the region 28 with flow lines 160 (shown in FIG. 4). A fitting 60 is provided to seal the flow port 58 in fluid communication with a connector fitting for connecting to one of the flow lines 160 (shown in FIG. 4). The flow line ports 58 is preferably connected to one of the flow lines 160 (shown in FIG. 4) for passing fluid into and withdrawing fluid from the cylinder 14. In other embodiments, separate flow line ports may be used for passing fluid into and withdrawing fluids from the cylinder 14. A sensor port 64 is provided in the head 56 for connecting a relative position sensor 66 to the control unit 150 (shown in FIG. 4). The fitting 62 is provided for sealing the sensor port 64, while sensor wires 65 are passed through the fitting for connecting to the electric conductors 158 (shown in FIG. 4). The relative position sensor 66 includes an inductive sleeve 68 and a rod 70. The rod 70 is preferably mounted within a bore 72 formed into the rod providing the piston 16. The inductive sleeve 68 includes a plurality of wire coils for passing a current and sensing inductance changes when the rod 70 is located in different positions relative to the inductive sleeve 68, to provide data signals which are passed through the sensor port 64 to the control unit 32. The bore hole 72 is a blind hole into the rod defining the piston 16 and within which the rod 70 is secured.

A second end of the cylinder 14 has a head 76 secured therein. An aperture 78 extends through the head 76 for passing the rod defining the piston 16 into the cylinder 34. Seal assemblies 80 and 82 are sealingly engaged between the head 76 and the rod of the piston 16. In some embodiments, the seal assemblies 80 and 82 may be replaced by conventional lip seals. A wear ring 84 is provided for slidably engaging the rod of the piston 16, to prevent damage to the seal assemblies 80 and 82. A seal 86 is secured between the head 76 and the cylinder 34. The seal 86 is preferably an O-ring seal. Spacer 88 and boss 90 are provided for spacing apart the seals 80 and 82 and the wear ring 84. Bearing portions 92 and 94 are provided on opposite sides of the strut 12. The control section 150 determines the position of the bearing portion 94 relative to a reference datum 96, with a bounce position 98 being above the reference datum 96 and a rebound position 100 being shown beneath the reference datum 96.

Figure 2:
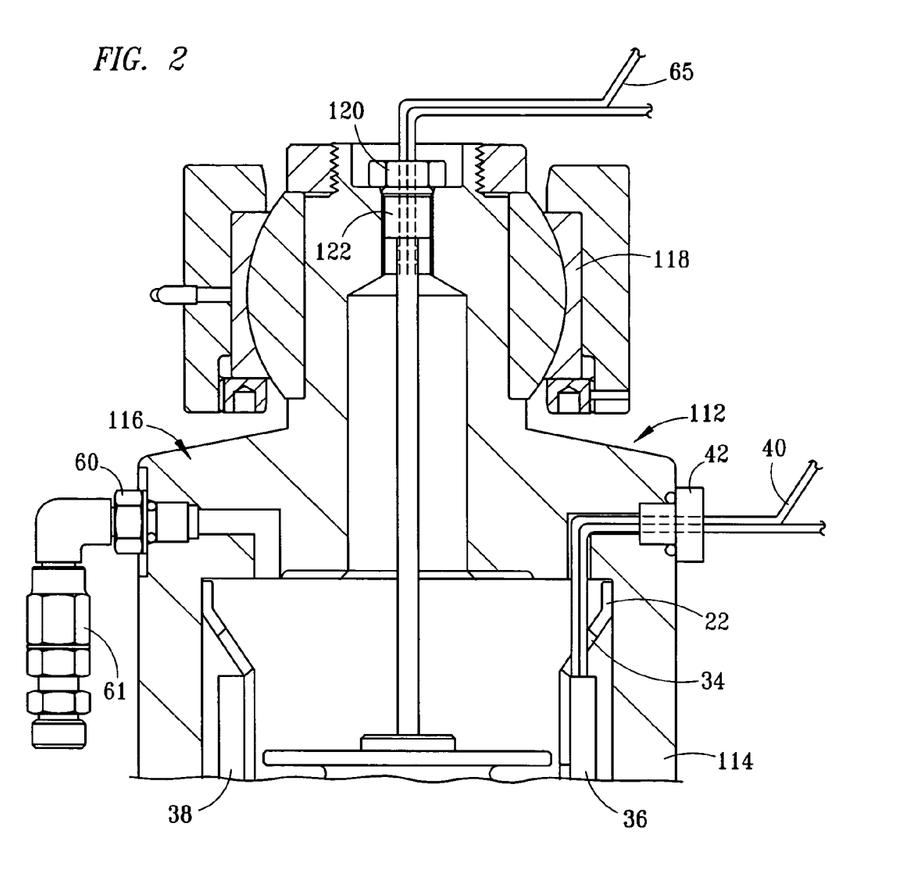
FIG. 2 is a partial longitudinal section view of an alternative strut having an alternative bearing mounting for one end of the strut.

FIG. 2 is a sectional view of an alternative strut 112 having a cylinder 114 with an alternative head 116 on an end thereof, preferably integrally formed as one piece with the cylinder 114. The head 116 is mounted interiorly within a bearing 118, and a sensor port 122 extends through the bearing 118. A fitting 120 is provided for sealing the outward end of the flow port 122 and passing the wires 65 for connecting to the controller 150 (shown in FIG. 4).

Figure 3:
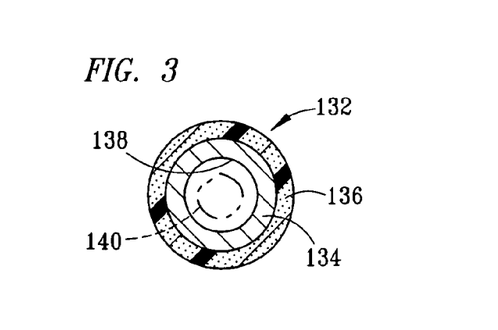
FIG. 3 is cross-sectional view of an electromagnetic field responsive particle use in a compressible fluid according to the present invention.

FIG. 3 is a sectional view of one of a plurality of particles 132 which are responsive to electromagnetic fields for suspending in a compressible base fluid to providing either a electrorheological fluid or a magnetorheological fluid. The particles 132 are dispersed in the compressible silicone base fluid according to the present invention to provide the compressible MR fluid 18. The particles 132 preferably have a hollow core member 134 which may be of spherical form, a polymer coating 136, and an electromagnetic field responsive particle 140. The particle 140 is preferably disposed in a void space 138 within the hollow core member 134 of the particle 132. In other embodiments, the particle 140 may not be included in the particles 132, provided the hollow core members 134 are made of materials which are sufficiently responsive to electromagnetic fields to provide a level of polarization for attracting adjacent particles 132 and thereby cause the viscosity of the fluid 18 to increase to a level sufficient to effect the valving effect of the present invention when electromagnetic fields are applied to the fluid 18. The hollow core member 134 is preferably formed of carbon, which is in some embodiments are provided by fullerene molecules, often referred to as a "buckminsterfullerenes," or "bucky balls." Typically, when bucky balls are used in the compressible fluid 18 of the present invention, the hollow core member 134 of the particles 132 will have a cage-like structure with an exterior shape resembling a soccer ball. The electromagnetic field responsive particle 140 is preferably formed of ferrous materials such as iron, iron oxide, iron cobalt, iron nitride, and other suitable materials, to provide a soft, magnetic material which is responsive to electromagnetic fields. The material is a soft, magnetic material, which is one which is easily polarized by electromagnetic fields, such that it is readily made to be attracted to adjacent particles of the material which are polarized in the same field, and then quickly lose the polarization when the field is removed.

The particles 132 typically range in diametrical size from one to one-hundred microns and preferably have diameters of approximately ten to twenty microns to retain the fluidity of the compressible fluid 18. The size and wall thickness of the hollow core member 134, the size of the void space 138, the thickness of the coating 136, and the size of the electromagnetic field responsive particle 140, as well as the materials and structure of these components, are preferably selected and formed by processes such that the density and modulus of elasticity of the particle 132 is compatible with the base fluid of the compressible fluid 18. A compatible density is provided to assure that the particles 132 do not settle out of suspension within the fluid 18, which is preferably a colloidal suspension. The modulus of elasticity of the particles 132 are preferably selected to have a similar modulus to the base fluid of the compressible fluid 18 so that the compressibility of the fluid 18 will not be diminished by inclusion of the electromagnetic responsive particles 132. In the preferred embodiment of the strut 12, the silicone base fluid has a density of approximately 57.4 lbs/ft$^3$, and a modulus of elasticity of approximately 135,000 psi at 5,000 psi pressure, which typically varies by approximately ten percent over the normal operating range of the strut 12.

Figure 4:
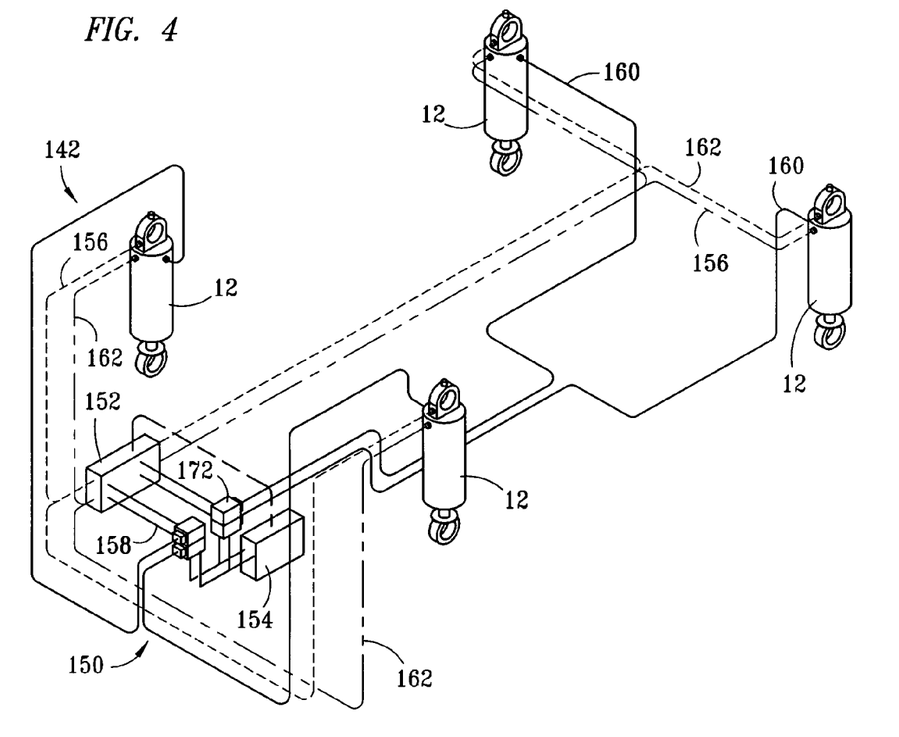
FIG. 4 is a schematic diagram of the suspension system having struts and a hydraulic power system and struts in which a compressible fluid is used.

FIG. 4 is a schematic diagram depicting a suspension system 142 which includes four of the struts 12. The suspension system 142 includes a control unit 150. The control unit 32 includes a CPU 152 and a pressure charge system 154. Signal lines 156 connect relative position sensors 66, which are mounted to respective ones of the struts 28, to the CPU 152. Fluid lines 158 then connect from the pressure charge system 154 to various ones of the struts 28 to apply pressure to the struts 28 according to program algorithms operating the CPU 152.

Figure 7:
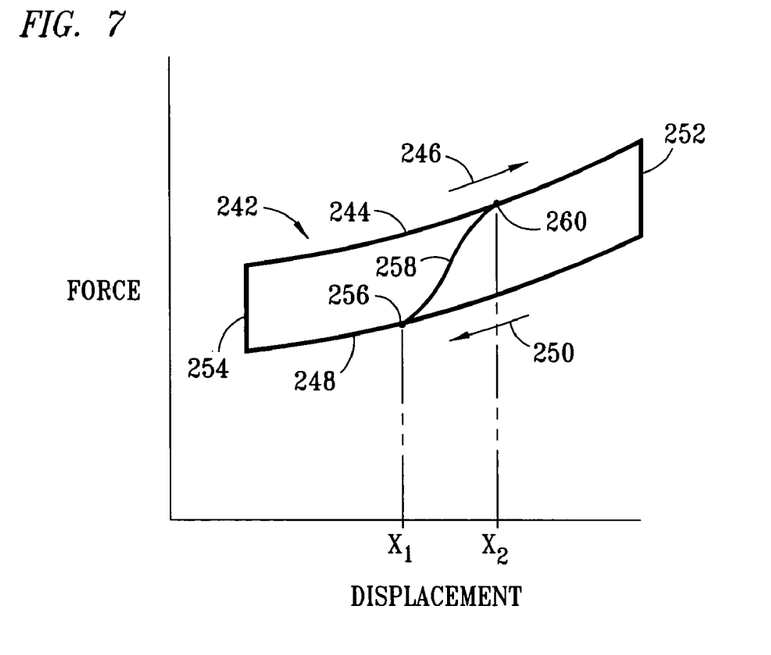
FIG. 7 is a graph of various operational states of a strut containing a compressible fluid.

In operation, the control section 150 provides control signals to operate the valves 172 to charge and discharge the compressible fluids from the strut, changing the spring constant for the strut to a desired value, as shown and described in FIG. 7. Charging the strut 12 by adding additional amounts of the compressible fluid into the strut 12 will increase the spring constant to the strut, stiffening the strut 12. Discharging a small amount of the compressible fluid from the strut 12 will decrease the spring constant for the strut, softening the action of the strut 12, which applies lesser amounts of force in response to a bounce. The control section 150 will also emit control signals which apply a voltage to the coil windings 38 in the electromagnetic field member 36, which determines the viscosity of the fluid 18 which is disposed in the annular space 26. Application of increased voltage values will cause the fluid 18 to have an increased viscosity which restricts and increases the stiffness of the strut 12. In some embodiments, flow may be stopped by increased application of voltage to potentially lock the strut in a fixed position, such as for outriggers for cranes. Application of decreased voltage values will reduce the viscosity of the fluid 18, allowing the fluid 18 to flow more freely and reducing the stiffness of the strut 12. Thus, the combination of the control section 150, the coil windings 38 and the fluid 18 in the annular space 26 provide a fast acting valve for controlling the flow of the compressible fluid 18 through the annular space 26, providing reaction times estimated to be as low as five milliseconds, as compared to conventional fluid systems having reaction time as low as fifty milliseconds. Ride height will in part be controlled by the stiffness of the strut 12, but primarily by fluid pressures applied to the charge valve 42 in response to ride height position sensors.

Figure 5:
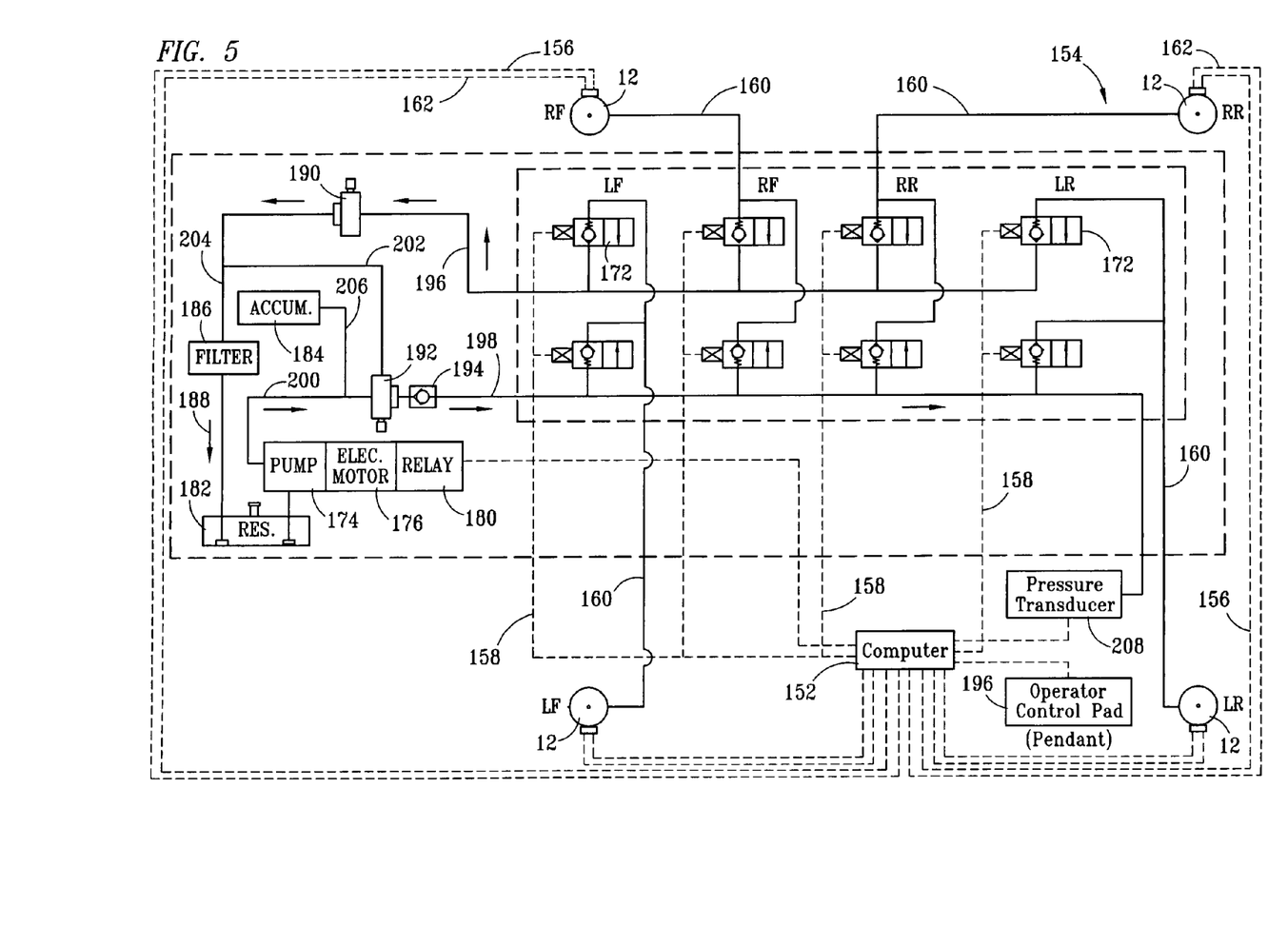
FIG. 5 is a more detailed schematic diagram depicting the control system for the suspension system, and shows detailed features of the hydraulic system for controlling operation of the struts.

FIG. 5 is a detailed schematic diagram depicting the control system for the suspension system 142, and shows detailed features of the hydraulic system for controlling operation of the struts. The computer 152 is connected by electrical control lines 158 to a plurality of valves 172, which are preferably pulse modulated valves so that the compressible fluid 18 maybe added or discharged from various ones of the struts 12 individually, with provides precise control of the amount of the compressible fluid 18 charged and discharged from the struts 12 to control the ride height and the spring constant for each of the struts 12. Flow lines 160 connected between respective pairs of the valves 172 and corresponding ones of the struts 12. The position sensors 66 of the struts 12 (shown in FIG. 1), which are preferably linear position sensors, are connected to computer 152 by signal wires 156. Control signal wires 162 connect the computer 152 to the coils 38 of the electromagnetic field generator 36 to apply a supply voltage, which determines the dampening characteristics of the strut 12. The computer senses the pressure applied to the pressure transducer and then controls a relay 180 which applies electric power to an electric motor 176, which powers a hydraulic pump 174. The pump 174 pulls compressible fluid 18 from the reservoir 182 and applies the compressible fluid to a supply line 198. A pressure relief valve 192 provided pressure relief for the pressure of the supply line 198. A check valve 194 is provided to prevent flow of the compressible fluid from the supply line 198 back into the pump 174 when the pump is cycled off. A flow line 206 connects an accumulator 184 to the discharge line 200 of the pump 174. Half of the control valves 172 are connected to the supply line 198 and to respective ones of the flow lines 160 for selectively charging the struts 12. The other half of the control valves 172 are connected from the flow lines 160 to a return line 196, for selectively discharging the compressible fluid 18 from the struts 12. The return line 196 is connected to a back pressure regulator 190, which keeps a minimum pressure of 400 psi in the line 196. The back pressure regulator 190 is connected to the line 204. A pressure relief line 202 is also connected to line 204, and connects to the pressure relief valve 192. A filter 187 is provided in the line 204, which then connects to the reservoir 182 for passing fluid in the direction 188.

Figure 6:
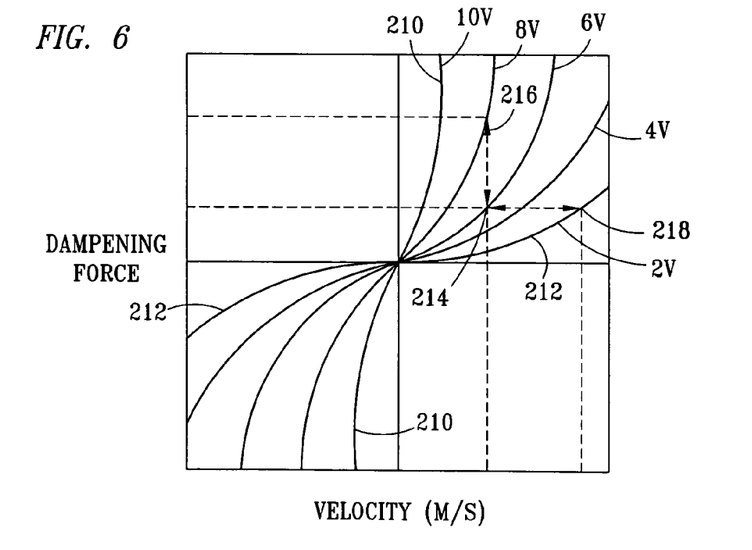
FIG. 6 is a graph of dampening performance for operation of a strut having variable dampening coefficients which are determined by varying a voltage signal to the strut.

FIG. 6 is a graph of dampening performance for operation of a strut 12 having variable dampening coefficients which are determined by varying a voltage signal to the strut 12. The curves 210 through 212 represents the dampening characteristics of the strut 12 at different voltages applied to the coils 38, with curve 218 representing 2.0 volts to the coils 28 and curve 210 representing 10.0 volts applied to the coils 38. The dampening characteristics for the strut 12 may be varied by application of different voltages. For example, when the strut is operating at a voltage of 6.0 volts, and at a velocity and dampening force represented by the point 214, the voltage applied to the coils 38 may be increased to 8.0 volts, which them moves the dampening characteristics of the strut 12 to the point 216. Similarly, when the strut is operating at a voltage of 6.0 volts, and at a velocity and dampening force represented by the point 214, the voltage applied to the coils 38 may be decreased to 2.0 volts, which them moves the dampening characteristics of the strut 12 from the point 214 to the point 216. The strength of the magnetic field applied in the secondary fluid chamber 26 is changed to vary the dampening characteristics of the strut 12, preferably such that there is greater dampening on the rebound stroke than in the higher velocity portion of the bounce, or jounce. The less dampening on the jounce allows more of the impact energy to be absorbed over a longer period of time to soften the blow of the impact forces.

FIG. 7 is a plot 242 of force versus displacement for one of the strut 12. A jounce stroke 244 in the direction 246, and bounce cycle 248 in the direction 250, are shown. The offsets 252 and 254 correspond to the initial control dampening and movement of the damper element. Movement along the curve 258 from point 256 to point 260 illustrates pressure being increased by more fluid being pumped into the cylinder of the strut 12. The addition of more fluid within the cylinder shifts the performance curve 242 upward from the ride height $X_1$, at a point 256, to the ride height $X_2$, at a point 260, in the performance curve 244. This will be discussed in more detail below, in reference to FIG. 8.

Figure 8:
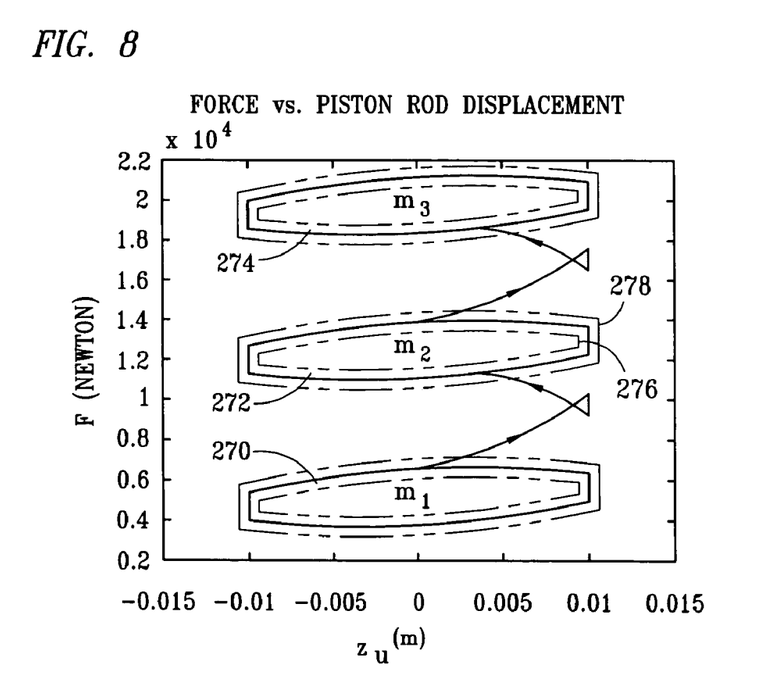
FIG. 8 is a graph depicting various spring rate constants according to fluid pressures applied to the strut containing a compressible fluid.

FIG. 8 is a graph obtained through simulations of the change in force F generated by the strut 12 versus displacement of the piston 16 ($Z_u$) as additional fluid is pumped into or removed from within the cylinder 14 of the strut 12. In experimentally determining this graph, the strut cylinder 14 was fixed while the strut piston 16 was given a sinusoidal disturbance. The mass of the compressible fluid 18 was increased by pumping the fluid 360 into the chamber 14 at three separate instances (i.e., $m_1$, $m_2$, and $m_3$). This caused the force versus displacement curve to shift upward from region 270 ($m_1$), to region 272 ($m_2$), and then to region 274 ($m_3$). Reduction of the strut force F can be obtained by discharging the fluid 18 from the cylinder 14 of the strut 12. A magnitude change in strut force F translates into a change in the static and dynamic spring constant characteristic of the strut 12. Active force control combined with the strut 12 will be able to affect such functions as basic load leveling, ride height control and gross vehicle motion control. Additionally, changes in the dampening characteristics of the strut 12 are depicted in FIG. 7 by the concentric curves drawing around curves m1, m2, and m3. For example, when the strut 12 is operating with a charge of compressible fluid 18, such that when operating on the curve 272 the voltage to the coils 38 may be increased to operate on the curve 278 with increased stiffness to the strut 12. Alternatively, the voltage may be decreased to the coils 38 to operate on the curve 276, with the strut 12 operating at a lower dampening value.

Figure 9:
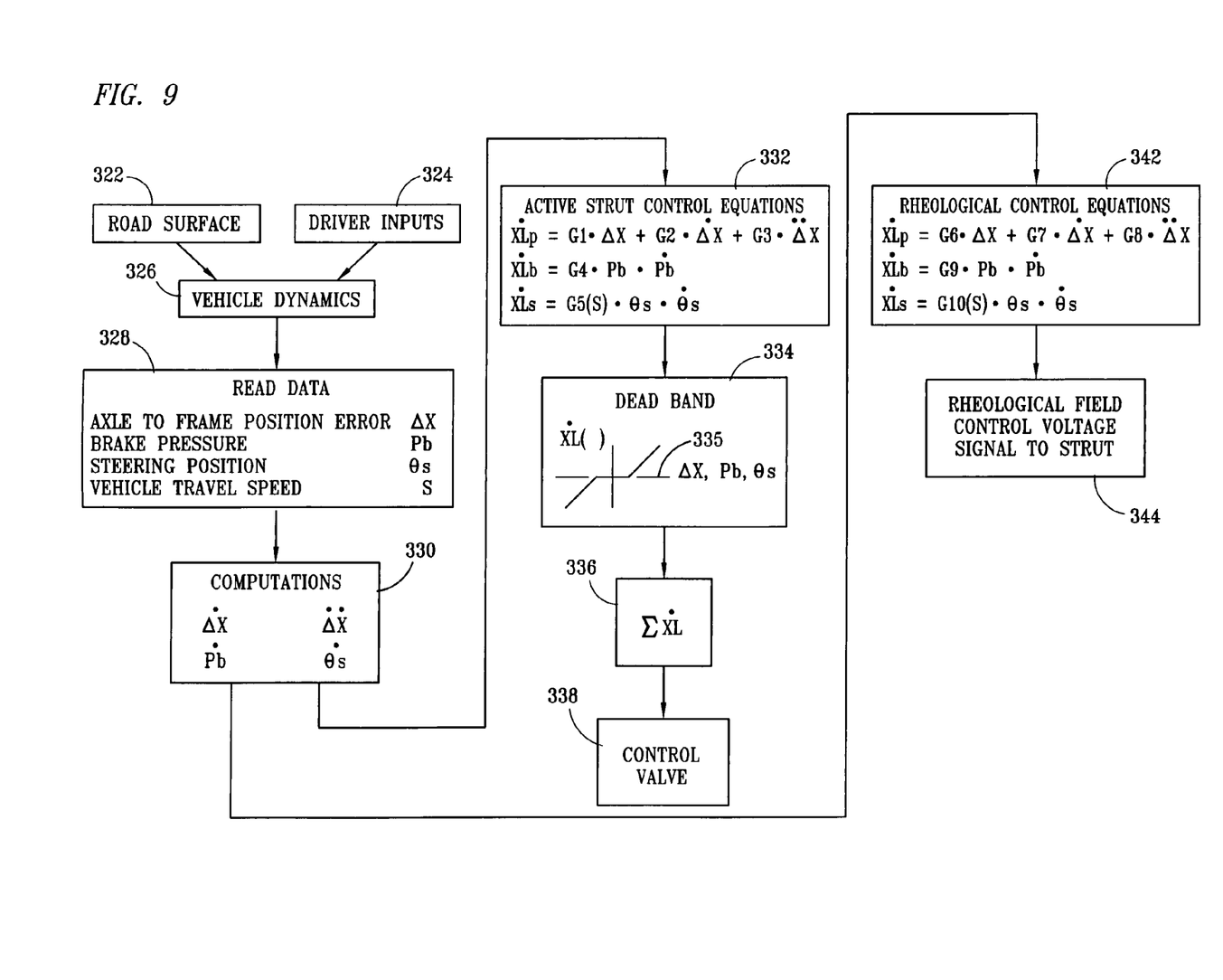
FIG. 9 is a flowchart of operation of a suspension control system.

FIG. 9 is a flowchart illustrating a control schematic for operation of a suspension system of to the present invention. The varying levels of a road surface 322 and driver selected inputs 324 are combined with the vehicle dynamics 326 to determine the various positional, or ride, parameters in step 328. Computations are performed in step 330 to determine various ones of the vehicle positional parameters. The vehicle ride parameters are then applied to control equations in step 332 and step 342 to determine control parameters. For the control equations in step 332, parameters are compared in the step 334 to a dead band range 335 to determine whether the suspension system will react passively or in an active mode. If the control parameters are of values which are either above or below the dead band range 335, the active control system will apply control parameters to the summation unit 336, which applies the sum of the various control parameters to the a strut control valves 172 in the step 338, which either removes or adds compressible fluid to the strut 12. If control parameters are in the dead band range 335, the system will react passively; that is, the amount of fluid in the strut 12 will remain the same. Control parameters from the step 342 are applied to control the voltage to the coil 38, controlling the dampening characteristics. Effects of control of strut spring constant and dampening characteristics are sensed in vehicle dynamics parameters, which provides feedback through sensing of the vehicle dynamics input 326.

Sprung mass motions below the wheel frequency can be mitigated by using skyhook dampening, or by rolling off, or reducing, the spring constant at low frequencies. Rolling off, or reducing, the dampening constant at high frequencies can easily mitigate motions above the wheel frequency. Such reductions in the spring and dampening coefficients may be accomplished by frequency-dependent filtering of spring and dampening coefficients for active suspension control through both an outer control loop, which generates the target strut forces, plus an inner force control loop, which compares the actual vehicle ride height, position and velocity data to a reference datum, defined herein as a skyhook reference. Additionally, dampening characteristics can be rolled off to match spring constants. Dampening characteristics may also be controlled to avoid an unsprung mass from encountering resonance frequencies, such that the frequency at which the unsprung mass is moving is taken out of phase from resonance frequencies.

Figure 10:
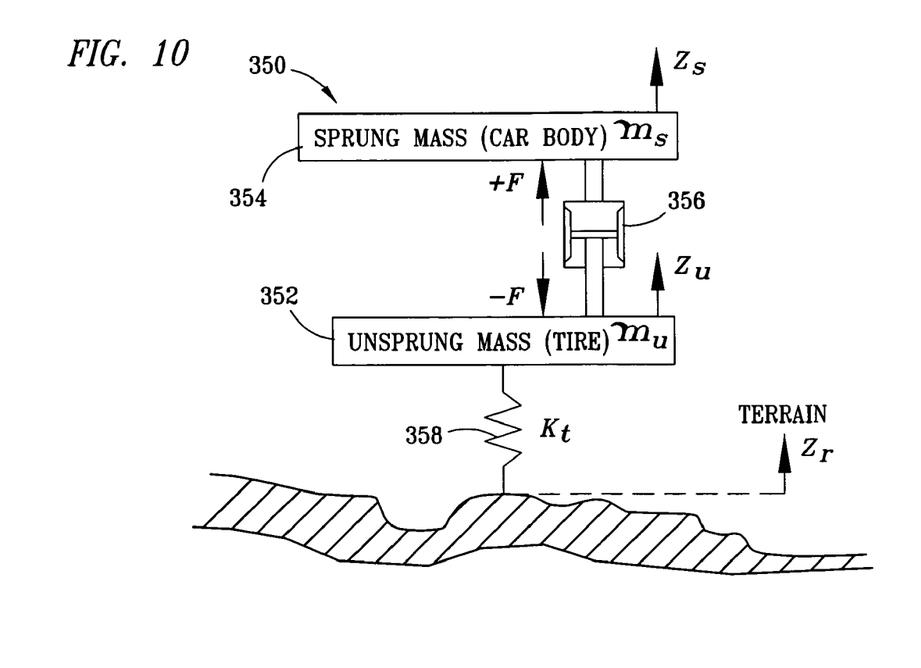
FIG. 10 is a schematic diagram depicting a theoretical model for calculating various operational parameters for a strut containing a compressible fluid.

FIG. 10 is a theoretical model of a one-quarter vehicle active suspension system 350 which represents a single wheel 352 of a vehicle. The wheel 352 and an axle connected to one-quarter portion of the car body 354 through an active hydraulic strut 356. The wheel 352 comprises a tire which is modeled as a simple spring 358 without dampening.

Figure 11:
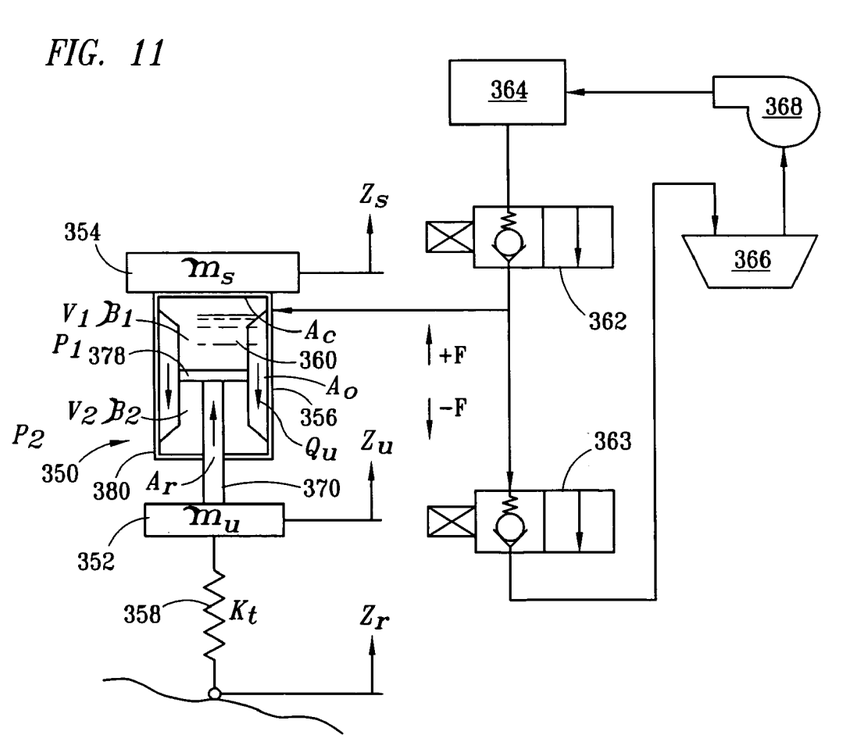
FIG. 11 is a schematic diagram depicting a model of a one-quarter vehicle, strut suspension system.

FIG. 11 is a more detailed view of the model of the one-quarter vehicle active control system 350 for a suspension system which incorporates the active hydraulic strut 356 containing a compressible fluid 360, such as the strut 28 in FIG. 1 or 2. The strut 356 allows for active adjustments in spring and dampening rates to maintain effective use of the full strut travel while accommodating variations in vehicle weight. The operating fluid 360 inside the strut 356 is a special compressible fluid, which when compressed, acts as a potential energy storage element. A piston 370, actually provided by the rod 370 and not the damper member 378, extends into a cylinder 380 to displace and compress the compressible fluid 360 within the cylinder 380. A damper member 378 is mounted to the end of the piston 370. Dampening is controlled by application of an electromagnetic field to fluid passing through the area $A_0$. The strut 356 can replace the two components of a conventional mechanical spring and dashpot suspension system. The strut 356 does not require any hydraulic fluid flow in order to comply with load input and shock impulses, thereby providing a faster spring response than conventional active strut systems, in which substantially incompressible hydraulic fluid is pumped into or out of a hydraulic strut members in response to variations in terrain. Additionally, since the vehicle rides on a column of compressible fluid 360, the strut 356 provides high frequency vibration isolation with an approximate effectiveness in the 25 Hz range to minimizes the terrain disturbance transmitted directly from the tires 352 to the vehicle frame 354.

The strut 356 works on a simple volume-displacement method to provide a compact spring function under both static (non-active) and dynamic (active) operating conditions. The static spring force function provides force F which suspends the vehicle 354 at desired ride height, while the dynamic spring force function provides an advantageous rising-rate spring curve characteristic which reduces vehicle body roll and pitch without the steep spring rates of conventional hydraulic systems. Active force control in the strut 356 is achieved by varying the mass of the compressible fluid 360 inside the cylinder 380 of the strut 356. The strut force F generated by the strut 356 can be varied by a control valve 362, which feeds compressible hydraulic fluid 360 between an accumulator 364 and the strut 356. A pump 368 pumps fluid 360 from a reservoir 366 to the accumulator 364. Dampening characteristics for the strut 356 are electrically controlled by varying the strength of the magnetic field applied to the annular area $A_0$.

According to the present invention, the ride height to leave bounce and rebound room is selected, and then actual ride height is measured with a position sensor, which may be a linear or a rotary sensor. The position sensor detects whether the strut is operating in the normal ride height operating band, and a signal to the computer which provides data for the position, which direction the strut is moving, and the velocity of the strut. From these signals, the computer preferably applies algorithms to determine the direction of force is being applied to the strut, and the resultant accelerations applied to the chassis and the strut itself. Control algorithms are automatically applied by the computer to control damping forces and hydraulic pressure that will reduce the energy transmitted to the frame and chassis mass, and to maintain a desired ride height within a selected ride height band, of vehicle weight or cargo weight. The suspension system of the present invention will provide maximum bounce room and the maximum rebound room at variable loads, while accommodating variations in terrain and providing vehicle stability control in pitch, roll, yaw and heave relative to the terrain. Dampening forces are electronically controlled independent of velocity, and energy may be dissipated at varying levels by varying the viscosity of the fluid to and vary the dampening force dissipation. The dampening force can be varied in real time by almost instantaneously varying the viscosity of the fluid, and depending on which direction the strut is moving, to vary the stiffness of the strut as the strut is moving. In conventional dampening systems for struts, the damping level is strictly a function of a flow rate and thus depending on velocity of the damper.

In the case of conventional active suspensions, the force provided by the strut is controlled by adding or discharging a relatively incompressible hydraulic fluid from a cylinder to increase pressure and decrease pressure. Although fast response valves are used to charge and discharge fluids from the strut, the system still will not react a fast a pressure applied to a compressible fluid. With a compressible fluid system made according to the present invention, a faster response time is achieved with much less energy than that which is required for a conventional hydraulic system. The response of a conventional hydraulic system may take as long as 50 milliseconds versus 5 milliseconds for the magnetorheological damping with compressible fluids. With a magnetorheological damping with a compressible fluid, the dampening is electronically controlled and is not just a function of the velocity and the spring constant of the compressible fluid type strut may be varied to vary the strut response while still achieving the must faster response times of direct pressure responses from forces acting on the compressible fluids. Much less power is required to charge or discharge fluids from a compressible fluid strut to change the spring constant to vary the response characteristics of the strut, as opposed to pumping conventional hydraulic fluids into and releasing the conventional hydraulic fluids from within the strut. Control to vary the performance characteristics on the level of compressible fluid struts with electronically controlled dampening is not achievable with common shock absorbers. When magnetorheological fluids and electrorheological fluids are used to control the dampening characteristics of a strut, the flow passage across which the electromagnetic field is applied serves as a valve which in which the flow of the fluid through the flow passage is changed in response to changes in viscosity caused by the applied magnetic field. With a strut configuration made according to the present invention, a wide range of damping characteristics may be achieved for a strut, independent of velocity, and with use of relatively little energy for controlling dampening.

Thus the advantages of this invention provides variable range dampening on demand to absorb shock, dissipate energy to minimize both peak loads to the chassis and to reduce cycle reversals. Suspension having struts made according to the present invention also provide better ride control, vehicle stability and vehicle mobility control. Variable range force control provides force changes as required to counter pitch, roll and heave of the vehicle which results in significant improvement in vehicle stability and mobility, as well as ride comfort. As compared to prior art suspension systems, suspension systems made according to the present invention will provide reduced drive and passenger fatigue, improved driver control, higher mobility speeds over varying terrain, decreased heat in suspensions and tires, reduced maintenance costs, including decreased fuel costs and reduced costs for tires, and reduced logistic costs.

In other embodiments, the rod may be provided by a cylindrical member, with the primary fluid chamber extending exteriorly about the secondary fluid chamber. In some embodiments, the field means 36 may be provided by control nodes which apply an electric field across the secondary fluid chamber 26 defining the flow passage 32, and in such embodiments an electrorheological fluid is preferably used. In other embodiments, the field means may provide a combination of an electric and a magnetic field to control the dampening characteristics of the strut 12.

Although the preferred embodiment has been described in detail, it should be understood that various changes, substitutions and alterations can be made therein without departing from the spirit and scope of the invention as defined by the appended claims.

What is claimed is:

1. A strut for a vehicle suspension system comprising:
   a primary fluid chamber;
   a displacement member extending into said primary fluid chamber;
   a damper element mounted to said displacement member and disposed in said primary fluid chamber for moving with said displacement member to dampen movement of said displacement member;
   a secondary fluid chamber having at least two distally disposed sections in fluid communication with said primary fluid chamber on respective opposite sides of said damper element;
   a compressible fluid which varies in viscosity in response to application of an electromagnetic field;
   field means disposed proximate to said secondary fluid chamber for generating an electromagnetic field within said secondary fluid chamber to determine an effective viscosity of said compressible fluid exposed to said electromagnetic field in a portion of said secondary fluid chamber disposed between said distally disposed sections;
   wherein an effective pressure of said compressible fluid within said primary fluid chamber and an intensity of said electromagnetic field is determined by a controller external to said strut;
   wherein said compressible fluid comprises particles which are responsive to electromagnetic fields; and
   wherein said particles comprise a hollow core member and an electromagnetic field responsive particle disposed within said hollow core member.

2. The strut for a vehicle suspension system of claim 1, wherein said particle further comprises a polymer coating on an exterior of said hollow core member.

3. The strut for a vehicle suspension system of claim 1, wherein said hollow core member is formed of carbon and said particles are formed to have a density and modulus of elasticity which are compatible with a compressible base fluid of said compressible fluid, such that said particles will remain in suspension within said compressible fluid and said particles have a substantially similar modulus of elasticity to that of the compressible base fluid.

4. A vehicle suspension system comprising:
   a primary fluid chamber;
   a displacement member extending into said primary fluid chamber;
   a damper element mounted to said displacement member and disposed in said primary fluid chamber for moving with said displacement member to dampen movement of said displacement member;
   a secondary fluid chamber having at least two distally disposed sections in fluid communication with said primary fluid chamber on respective opposite sides of said damper element;
   a compressible fluid which varies in viscosity in response to application of an electromagnetic field;
   field means disposed proximate to said secondary fluid chamber for generating an electromagnetic field within said secondary fluid chamber to determine an effective viscosity of said compressible fluid exposed to said electromagnetic field in a portion of said secondary fluid chamber disposed between said two distally disposed sections;
   sensors for detecting data for defining vehicle motion;
   a controller which in response to the data detected by said sensors determines an effective pressure of said compressible fluid within said primary fluid chamber and determines an intensity of said electromagnetic field within said secondary chamber; and
   wherein said compressible fluid comprises particles which are responsive to electromagnetic fields, said particles having a hollow core member and an electromagnetic field responsive particle disposed within said hollow core member, wherein said hollow core member is formed of carbon and said particles are formed to have a density and modulus of elasticity which is compatible with a base fluid of said compressible fluid.

5. The vehicle suspension system of claim 4, wherein said field means is an electric coil which applies a magnetic field to said particles of said compressible fluid disposed within said secondary fluid chamber.

6. A suspension system for supporting a suspended body from a support member which is subject to vibratory motion, comprising:
   a cylinder having an interior bore, said bore defining a cylinder chamber, and said cylinder having an aperture formed to extended into said cylinder;
   a sleeve fitting within said cylinder to define a primary fluid chamber and a secondary fluid chamber, said primary fluid chamber disposed within said sleeve and said secondary fluid chamber disposed in an annular space extending between an exterior of said sleeve and an interior of said cylinder chamber;
   a compressible fluid which varies in viscosity in response to application of an electromagnetic field, said compressible fluid disposed in said primary fluid chamber and said secondary fluid chamber;
   a fluid displacement member moveably extending through said aperture and into said primary fluid chamber;
   wherein movement of said fluid displacement member in a first direction through said aperture and into said cylinder chamber increases said fluid pressure in said chamber, such that said compressible fluid pressure exerts a resultant force which pushes against said fluid displacement member in a second direction;
   a damper element mounted to said fluid displacement member and disposed in said primary fluid chamber for moving with said fluid displacement member to dampen movement of said displacement member;
   said sleeve having apertures for providing fluid communication between said primary fluid chamber and said secondary fluid chamber, with respective ones of said apertures disposed on opposite side of said damper element;
   field means disposed proximate to said secondary fluid chamber for generating an electromagnetic field within said secondary fluid chamber to determine an effective viscosity of said compressible fluid exposed to said electromagnetic field within said secondary fluid chamber; and a control section for determining an effective pressure of said compressible fluid within said primary fluid chamber and for determining an intensity of said electromagnetic field within said secondary chamber;

wherein said cylinder is secured to one of said suspended body and said support member, and said fluid displacement member is secured to the other of said support member and said suspended body;

wherein said field means comprises coil windings connected to said control section and disposed relative to said annular space for selectively passing an electric current through said coil windings and applying said electromagnetic field to a portion of said fluid which is disposed interiorly within said annular space to control a stiffness of said strut; and wherein said compressible fluid comprises particles which are responsive to electromagnetic fields, said particles having a hollow core member and an electromagnetic field responsive particle disposed within said hollow core member, wherein said hollow core member is formed of carbon and said particles are formed to have a density and modulas of elasticity which is compatible with a base fluid of said compressible fluid.

7. The suspension system according to claim 6, wherein said damper element has a flow passage which extends through said piston and is sized for restricting flow of said compressible fluid through said piston.

8. A method for operating a strut of a suspension system for supporting a suspended body relative to a support member which is subject to vibratory motion, the method comprising the steps of:

providing a cylinder defining a cylinder chamber, the cylinder having an aperture formed to extends into the cylinder and through which a fluid displacement member moveably extends;

providing a compressible fluid disposed within the cylinder chamber and having a fluid pressure, the compressible fluid changing viscosity in response to being exposed to electromagnetic fields;

providing the fluid displacement member to extend through the aperture and into the cylinder chamber; wherein movement of the fluid displacement member in a first direction through the aperture and into the cylinder chamber increases the fluid pressure in the chamber, such that the fluid pressure exerts a resultant force which pushes against the fluid displacement member in a second direction;

providing a seal which sealingly engages between the fluid displacement member and the cylinder;

securing the cylinder and the fluid displacement member to different ones of the suspended body and the support member;

securing a sleeve within the cylinder chamber to define a primary chamber and a secondary chamber, the primary chamber being disposed interiorly of the sleeve and the secondary chamber being disposed in an annular space between the sleeve and the cylinder;

providing a damper element which is secured to the fluid displacement member and disposed interiorly within the cylinder chamber, such that the damper element is moveable with the fluid displacement member relative to the compressible fluid to restrict movement of the fluid displacement member relative to the compressible fluid;

providing a field means for applying an electromagnetic field to the compressible fluid disposed within the secondary chamber; and applying electric energy to the field means to apply the electromagnetic field to the compressible fluid disposed within the secondary chamber, and thereby determine a dampening coefficient for the strut;

providing a fluid flow port into the cylinder chamber;

passing compressible fluid through the fluid flow port to determine a spring constant for the compressible fluid in response to detecting motion of the suspended body relative to a reference datum;

wherein the step of applying the electric energy to the field means applies a magnetic field to the compressible fluid, which changes the viscosity of the compressible fluid in response to the magnetic field; and wherein the step of providing the compressible fluid comprises the step of providing the compressible fluid with particles which are responsive to magnetic fields, with the particles being of compatible density and modulus of elasticity with a base fluid of the compressible fluid for remaining suspended within the compressible fluid and providing the compressible fluid with a modulus of elasticity which is substantially similar to the modulus of elasticity of the base fluid.

9. The method according to claim 8, further comprising providing a control system which selectively disposes the compressible fluid within the cylinder chamber to control pressures of the compressible fluid within the cylinder chamber of the strut of the suspension system in response to fluid pressure control signals, wherein the pressures of the compressible fluid within the cylinder chamber determine values for spring rate coefficients of the strut;

providing a sensor for detecting relative positions of the suspended body relative to the support member;

emitting the pressure control signals and controlling the pressures of the compressible fluid within the strut to determine the spring rate coefficients in response to sensed values from the sensor; and emitting damping control signals to apply the electromagnetic field to the compressible fluid within the secondary chamber and determine the dampening coefficients in response to sensed values from the sensors.

* * * * *